Figure 1:
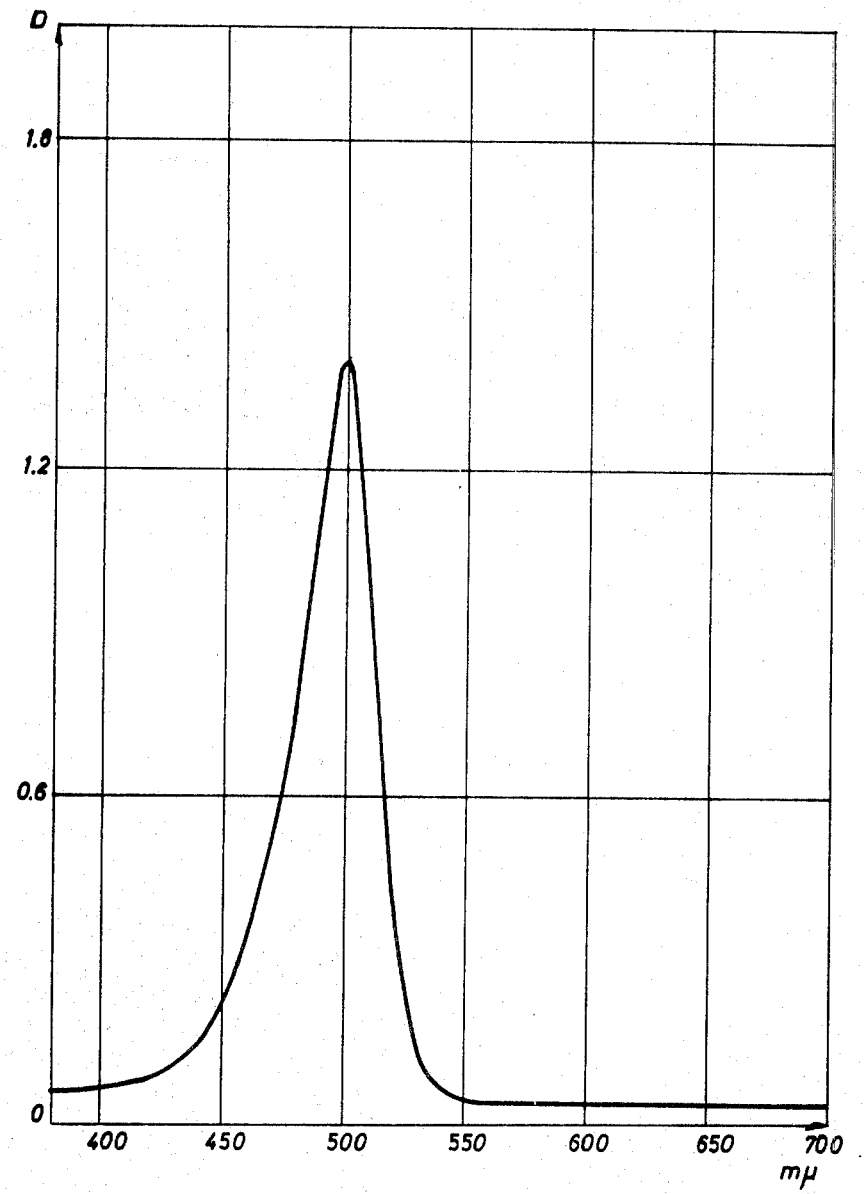

United States Patent
Depoorter et al.

[15] 3,653,905
[45] Apr. 4, 1972

[54] OXONOL DYES IN FILTER AND ANTI-HALATION LAYERS

[72] Inventors: Henri Depoorter, Mortsel; Alfred Rillaers, Kontich; Gerard Lemahieu, Mortsel; Felix Jan Moelants, Wilrijk, all of Belgium

[73] Assignee: Gevaert-Agfa N.V., Mortsel, Belgium

[22] Filed: May 13, 1969

[21] Appl. No.: 824,087

[30] Foreign Application Priority Data

May 21, 1968 Great Britain ..................... 24,070/68

[52] U.S. Cl. ................................................96/84, 96/106
[51] Int. Cl. ..........................................................G03c 1/84
[58] Field of Search ...............................96/84, 106, 69, 73

[56] References Cited

UNITED STATES PATENTS

| | | | |
|---|---|---|---|
| 3,468,883 | 9/1969 | Bailey | 96/84 |
| 3,247,127 | 4/1966 | Bailey | 96/84 |
| 3,440,051 | 4/1969 | Bailey | 96/84 |
| 3,471,293 | 10/1969 | Ohlschlager et al. | 96/84 |

Primary Examiner—Norman G. Torchin
Assistant Examiner—Edward C. Kimlin
Attorney—Alfred W. Breiner

[57] ABSTRACT

Light-screening oxonol dyes are provided for use as filter dyes and anti-halation dyes in photographic non-light-sensitive colloid layers and as screening dyes in photographic light-sensitive emulsion layers which are discharged quickly, completely, and irreversibly in the photographic processing liquids even in the "lith"-type of developers. The novel light-screening dyes of the invention have the general formula:

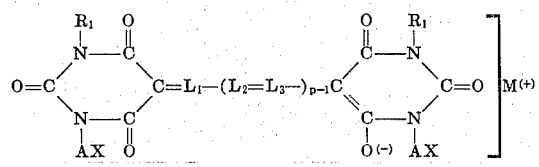

wherein:
A stands for a branched or unbranched alkylene group including alkylene interrupted by one or more hetero atoms such as oxygen,
X stands for alkoxycarbonyl comprising in the alkoxy group at most 5 carbon atoms, hydroxyl, sulpho in acid or salt form, cyano, halogen such as chlorine or the group $SO_2R$ wherein R stands for alkyl including substituted alkyl or aryl including substituted aryl,
$R_1$ stands for hydrogen, alkyl including substituted alkyl, e.g., the group AX, cycloalkyl, allyl, aralkyl including substituted aralkyl, aryl including substituted aryl,
each of $L_1$, $L_2$, and $L_3$ stands for methine including substituted methine, e.g., methine substituted by alkyl, aralkyl, aryl and carboxy,
M stands for a cation, e.g., a hydrogen cation, a metal cation or an onium cation of inorganic or organic nature such as ammonium and pyridinium, and
p stands for 1, 2, or 3.

6 Claims, 2 Drawing Figures

OXONOL DYES IN FILTER AND ANTI-HALATION LAYERS

The present invention relates to new methine dyes, to their preparation, to their use in photographic elements as light screening dyes and to elements containing said dyes.

It is known, for many purposes, to incorporate light screening dyes into photographic elements. Such a light screening dye may be used as filter dye in a layer coated over one or more light-sensitive emulsion layers or between two emulsion layers e.g. differently color-sensitized emulsion layers to protect the underlying light-sensitive emulsion layer(s) from the action of light of wavelength absorbed by such light screening dye or it may be used as screening dye in a light-sensitive emulsion layer for the purpose of modifying a light record in such emulsion layer or it may be used as antihalation dye in a layer not containing a light-sensitive substance known as antihalation layer situated on either side of the support carrying the light-sensitive emulsion layer(s).

Light-screening dyes should meet severe demands in order to be useful in photographic elements. They should not affect the inherent sensitivity or optical sensitivity of light-sensitive emulsions with which they may come into contact. They should have good absorption characteristics and should not give rise to fogging. Further they should be readily rendered ineffective i.e. decolorized or destroyed and removed, in at least one of the photographic processing liquids.

Numerous compounds have been employed as light screening dyes for the purposes given above. Many adversely affect the sensitivity of the light-sensitive emulsions with which they come into contact and others are unsuitable for certain applications in that they are not easily discharged or incompletely discharged in the processing solutions.

For instance, among the light-screening dyes that are widely employed nowadays in light-sensitive materials, oxonol dyes derived from pyrazolones are important representatives. However, these oxonol dyes have an important disadvantage in that they are unsuitable for use in light-sensitive graphic art materials, more particularly in the "lith"-type of light-sensitive materials. Indeed, these oxonol dyes derived from pyrazolones are incompletely decolorized in the special so-called "lith"-type of developers whereby said developers are easily stained (colored).

By "lith"-type of developer is understood an aqueous developing solution containing as sole developing substance hydroquinone and as anti-oxidant a bisulphite addition compound of an aliphatic aldehyde or ketone e.g. formaldehyde bisulphite.

According to the present invention novel light screening oxonol dyes are provided for use as filter dyes and antihalation dyes in photographic non-light-sensitive colloid layers and as screening dyes in photographic light-sensitive emulsion layers which are discharged quickly, completely and irreversibly in the photographic processing liquids even in the "lith"-type of developers.

The novel light-screening dyes of the invention can be represented by the general formula:

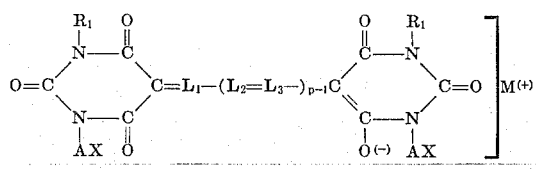

wherein:
A stands for a branched or unbranched alkylene group including alkylene interrupted by one or more hetero atoms such as oxygen,
X stands for alkoxycarbonyl comprising in the alkoxy group at most 5 carbon atoms, hydroxyl, sulpho in acid or salt form, cyano, halogen such as chlorine or the group $SO_2R$ wherein R stands for alkyl including substituted alkyl or aryl including substituted aryl,
$R_1$ stands for hydrogen, alkyl including substituted alkyl e.g. the group AX, cycloalkyl, allyl, aralkyl including substituted aralkyl, aryl including substituted aryl,
each of $L_1$, $L_2$ and $L_3$ stands for methine including substituted methine e.g. methine substituted by alkyl, aralkyl, aryl and carboxy,
M stands for a cation, e.g., a hydrogen cation, a metal cation or an onium cation of inorganic or organic nature such as ammonium and pyridinium, and
p stands for 1, 2 or 3.

By appropriate choice of the substituents the characteristics of the novel light screening dyes of the invention as regards absorption range, solubility and fastness to diffusion can be adapted to the necessities.

In the following table representative screening dyes of the present invention are given.

TABLE

| Dye | AX | $R_1$ | $L_1, L_2, L_3$ | P | M |
|---|---|---|---|---|---|
| 1 | $CH_2COOC_2H_5$ | $C_2H_5$ | CH | 2 | H |
| 2 | $CH_2COOC_2H_5$ | $n-C_4H_9$ | CH | 2 | H |
| 3 | $CH_2COOC_2H_5$ | $HC(CH_3)_2$ | CH | 2 | H |
| 4 | $CH_2CH_2OH$ | $C_2H_5$ | CH | 2 | H |
| 5 | $CH_2CH_2OH$ | $C_6H_5$ | CH | 2 | H |
| 6 | $CH_2CH_2OH$ | $n-C_4H_9$ | CH | 2 | H |
| 7 | $CH_2COOC_2H_5$ | $C_2H_5$ | CH | 3 | H |
| 8 | $CH_2COOC_2H_5$ | $HC(CH_3)_2$ | CH | 3 | H |
| 9 | $CH_2COOC_2H_5$ | $n-C_4H_9$ | CH | 3 | H |
| 10 | $CH_2COOC_2H_5$ | H | CH | 3 | H |
| 11 | $CH_2CH_2OH$ | $C_2H_5$ | CH | 3 | H |
| 12 | $CH_2CH_2OH$ | $C_6H_5$ | CH | 3 | H |
| 13 | $CH_2CH_2OH$ | $n-C_4H_9$ | CH | 3 | H |
| 14 | $CH_2CH_2OCH_2CH_2OH$ | $C_2H_5$ | CH | 2 | H |
| 15 | $H_3CCH(OH)CH_2$ | $C_2H_5$ | CH | 2 | H |
| 16 | $CH_2CH_2CH_2OH$ | $C_2H_5$ | CH | 2 | H |
| 17 | $CH_2CH_2Cl$ | $n-C_4H_9$ | CH | 2 | H |
| 18 | $CH_2CH_2CN$ | $n-C_4H_9$ | CH | 2 | H |
| 19 | $CH_2CH_2SO_2CH_3$ | $C_6H_5$ | CH | 2 | H |
| 20 | $CH_2CH_2SO_3Na$ | H | CH | 2 | H |
| 21 | $CH_2CH_2OCH_2CH_2OH$ | $C_2H_5$ | CH | 3 | H |
| 22 | $CH_2CH(OH)CH_3$ | $C_2H_5$ | CH | 3 | H |
| 23 | $CH_2CH_2CH_2OH$ | $C_2H_5$ | CH | 3 | H |
| 24 | $CH_2CH_2CN$ | $n-C_4H_9$ | CH | 3 | H |
| 25 | $CH_2CH_2SO_3Na$ | H | CH | 3 | Na |

The novel light screening dyes according to the present invention can be prepared by allowing to react in the presence of a base such as triethylamine or pyridine the appropriately substituted barbituric acids with compounds known to those skilled in the art for introducing a methine group or a polymethine chain in methine dyes. For more details about such compounds there can be referred to U.K. Pat. Specification 1,133,986 filed Apr. 20, 1965 by L. Van der Auwera.

More particularly, for the introduction of a monomethine group there can be used a compound derived from formic acid, or acetic acid such as an ortho-ester, e.g., methyl orthoformate, ethyl orthoformate, ethyl orthoacetate, or an amidine; for the introduction of a trimethine chain an alkoxyacrolein acetal, anilino-acrolein anil or malondialdehyde diacetal can be used and for the introduction of a pentamethine chain glutacondialdehyde dianil can be used.

The required barbituric acids can be prepared by reaction of the appropriate urea with malonic acid in the presence of acetic anhydride. The required urea can be obtained by reaction in an inert solvent such as benzene of an organic isocyanate or an anorganic cyanate such as potassium cyanate with a primary amine.

The following further illustrates the preparation of the barbituric acids.

PREPARATION 1 : N-ethyl-N'-hydroxyethylbarbituric acid

To a solution of 13.2 g (0.1 mole) of N-ethyl-N'-hydroxyethylurea and 12.2 g (0.12 mole) of malonic acid in 20 ml of acetic acid 40 ml of acetic anhydride are added with stirring at 60°–65 C. The reaction mixture is heated on a boiling water bath for 6 hours. The acetic acid is distilled off under vacuum and the residue dissolved in 150 ml of water with 10 g of sodium hydroxide in order to hydrolyse the acetylated hydroxyl group. The solution is set aside for 6 hours at room temperature whereupon it is acidified with concentrated hydrochloric acid, extracted with chloroform and the dried chloroformic extract is evaporated under reduced pressure. The nearly solid residue is finally recrystallized from isopropanol. Yield : 8.8 g. Melting point : 107° C.

PREPARATION 2 : N-(2-sulphoethyl)barbituric acid

In a solution of 148 g of malonic acid in 236 ml of acetic acid, 244 g of 2-sulphoethylurea potassium salt, prepared by treating a concentrated aqueous solution of taurine with solid potassium cyanate, are suspended. The mixture is heated to 60°–70 C whereupon 472 ml of acetic anhydride are added dropwise with stirring. The temperature is gradually raised to 90° C. After having kept the reaction mixture for 6 hours at 90° C it is allowed to cool overnight. The precipitate formed is filtered off and digested with 1 liter of acetic acid. The product is then filtered off, washed with ether and dried.

The crude potassium salt of N-(2-sulphoethyl)-barbituric acid thus obtained weighs 193 g. By passing an aqueous solution of said salt over an ion-exchange resin in the acid form, the free acid is liberated.

In the following table are given the melting points (or boiling points) of some appropriately substituted barbituric acids and of the corresponding ureas.

| N-substituent | N'-substituent | Melting point of the urea, ° C. | Melting or boiling point of the barbituric acid, ° C. |
|---|---|---|---|
| $C_2H_5$ | $CH_2COOC_2H_5$ | 94 | 96 |
| $CH(CH_3)_2$ | $CH_2COOC_2H_5$ | 100 | 140 |
| $n\text{-}C_4H_9$ | $CH_2COOC_2H_5$ | 45 | (1) |
| $C_2H_5$ | $CH_2CH_2OH$ | 45 | 107 |
| $n\text{-}C_4H_9$ | $CH_2CH_2OH$ | 65 | (1) |
| $C_6H_5$ | $CH_2CH_2OH$ | 124 | 128 |
| $C_2H_5$ | $CH_2CH_2OCH_2CH_2OH$ | (2) | (1) |
| $C_2H_5$ | $CH_2CH(OH)CH_3$ | (2) | 107 |
| $C_2H_5$ | $CH_2CH_2CH_2OH$ | (2) | (1) |
| $n\text{-}C_4H_9$ | $CH_2CH_2Cl$ | 70 | (1) |
| $n\text{-}C_4H_9$ | $CH_2CH_2CN$ | 84 | (2) |
| $C_6H_5$ | $CH_2CH_2SO_2CH_3$ | 144 | 180 |
| H | $CH_2CH_2SO_2Na$ | 3 >250 | 3 >250 |

1 B.P. 150° C./0.03 mm.
1 B.P. 126° C./0.05 mm.
1 B.P. 200° C./0.3 mm.
1 B.P. 119-121° C./0.001 mm.
2 Oily product.
3 Potassium salt.

The following preparations illustrate how the dyes according to the present invention can be prepared.

PREPARATION 3 : Dyestuff 1 is prepared as follows :

A mixture of 24.2 g (0.1 mole) of N-ethyl-N'-ethoxycarbonylmethylbarbituric acid, 8.7 g (0.05 mole) of triethoxypropene and 28 ml of triethylamine in 50 ml of pyridine is boiled for 15 min. The solution is allowed to cool to room temperature and subsequently poured into 200 ml of hydrochloric acid (17 percent by weight) and about 100 g of ice. The precipitated dye is isolated by filtration, rinsed with some water and dried in vacuum. Yield : 27 g. Melting point : 80° C.

PREPARATION 4 : Dyestuff 5 is prepared as follows :

3.3 g of N-phenyl-N'-hydroxyethylbarbituric acid and 1.1 g of triethoxypropene are dissolved in 6 ml of pyridine whereupon 3.4 ml of triethylamine are added and the solution is boiled for 10 min. The dye is obtained by pouring the reaction mixture into hydrochloric acid (17 percent by weight) with some ice and chilling the resulting slurry. After filtration and drying 4 g of dye with a melting point of about 120° C are obtained.

PREPARATION 5 : Dyestuff 8 is prepared as follows :

A dry mixture of 25.6 g (0.1 mole) of N-isopropyl-N'-ethoxycarbonylmethylbarbituric acid and 14.2 g (0.05 mole) of glutacondialdehyde dianil hydrochloride is added with stirring to 200 ml of pyridine at 0° C whereupon 56 ml of triethylamine are added. The reaction mixture is stirred for 1 hour at room temperature and heated to 70° C for a short time on a water bath. After cooling, the dye solution is poured into 600 ml of hydrochloric acid (17 percent by weight) with external chilling. The mixture is stirred for 1 hour whereupon some more hydrochloric acid is added. The dye becomes more crystalline and is separated by filtration, washed with a little water and dried at 35° C in vacuum. Yield : 40 g. Melting point : 110° C.

PREPARATION 6 : Dyestuff 13 is prepared as follows :

To a mixture of 60 ml of pyridine and 17 ml of triethylamine are added 7.2 g of N-butyl-N'-hydroxyethylbarbituric acid and 4.3 g of glutacondialdehyde dianil hydrochloride. The solution is stirred, left for 1 hour at room temperature and heated for 10 min. on a boiling water bath. The intermediate compound formed with an absorption maximum at 530 nm has disappeared. The cooled reaction mixture is then poured into 180 ml of hydrochloric acid (17 percent by weight) with some ice while cooling externally. By stirring the dye slurry for a while in this aqueous medium the solid becomes less sticky. The dye is filtered, washed with water and dried. Yield : 8.5 g. Melting point : 60° C.

PREPARATION 7 : Dyestuff 20 is prepared as follows :

To a solution of 11.5 g N-(2-sulphoethyl)barbituric acid in 18 ml of pyridine, 11 ml of triethylamine and 3.3 g of 1,3,3-triethoxypropene are added. The mixture is boiled for 5 min. and then poured into 300 ml of acetone. The sticky precipitate is purified by dissolving it in 150 ml of water and reprecipitating it with 300 ml of a 25 percent sodium chloride solution. The dye is filtered and dried. Yield : 3 g.

PREPARATION 8 : Dyestuff 25 is prepared as follows :

To a solution of 8.5 g N-(2-sulphoethyl)barbituric acid in 34 ml of pyridine, 16 ml of triethylamine are added. While keeping the temperature between 0° and 5° C, 4 g of glutaconaldehyde dianil hydrochloride are added with stirring. The mixture is left standing till the temperature reaches room-temperature whereupon it is heated for 30 minutes on a boiling water bath. The mixture is cooled whereupon it is poured into acetone. The supernatant liquid is decanted and the sticky precipitate is washed first with acetone and then with ether. After drying, 9.4 g of the impure triethylamine salt of dye 25 are obtained. A pure product is obtained by dissolving the dye in 150 ml of water and reprecipitating it by means of 300 ml of a 25 percent sodium chloride solution. The dye is filtered and dried. Yield : 2.7 g (29 percent).

The dyes of formulae 2, 3, 4, 6, 14, 15, 16, 17, 18 and 19 can be prepared according to the method described in preparations 3 and 4, the dyes of formulae 9, 11, 12, 21, 22, 23 and 24 can be prepared according to the method of preparation 5 and the dyes of formulae 7 and 10 can be prepared by means of the method of preparation 6.

The absorption characteristics of the dyes measured in methanolic solution are listed in the following table

TABLE

| Dyestuff | Absorption Maximum nm | $\epsilon \cdot 10^{-5}$ |
|---|---|---|
| 1 | 493 | 0.91 |
| 2 | 494 | 0.81 |
| 3 | 493 | 0.78 |
| 4 | 492 | 0.87 |
| 5 | 495 | 0.91 |
| 6 | 495 | 0.54 |
| 7 | 590 | 0.91 |
| 8 | 590 | 1.00 |
| 9 | 588 | 0.84 |
| 10 | 590 | 0.83 |
| 11 | 590 | 0.89 |

| | | |
|---|---|---|
| 12 | 590 | 1.14 |
| 13 | 590 | 1.17 |
| 14 | 495 | 1.18 |
| 15 | 494 | 1.21 |
| 16 | 495 | 0.76 |
| 17 | 492 | 0.92 |
| 18 | 495 | 0.98 |
| 19 | 519 | 0.66 |
| 20 | 493 | 0.59 |
| 21 | 592 | 1.28 |
| 22 | 590 | 1.36 |
| 23 | 593 | 1.12 |
| 24 | 592 | 1.33 |
| 25 | 586 | 0.65 |

The dyestuff according to the invention can be applied in any photographic material based on light-sensitive silver halide, when easily dischargeable dyestuffs are desired or necessary. Examples of applications of these dyes are : in an antihalation layer e.g. between the support and a light-sensitive silver halide emulsion layer or at the back of the support, in a filter layer above or between the light-sensitive silver halide emulsion layers or as screening dye in a light-sensitive silver halide emulsion layer or in another colloid layer in water-permeable relationship with the said emulsion layer e.g. an antistress layer from which the dye can diffuse into the said emulsion layer, provided, of course, that the said dye is incorporated in the said other colloid layer in a form not fast to diffusion. Said dyestuffs when used as screening dye in a light-sensitive silver halide emulsion layer or in a layer in water-permeable relationship therewith do not or practically do not decrease the inherent and/or spectral sensitivity of the silver halide.

The dyes according to the present invention can be incorporated into a photographic material according to any technique known to those skilled in the art. The following is a mere description of some appropriate techniques and has no intention of limiting the scope of the invention.

A dye salt according to the present invention is dissolved in water, whereupon the solution obtained is dispersed, occasionally in the presence of a wetting agent, in a hydrophilic colloid composition, preferably a gelatin solution. With a mixture so obtained, layers can be coated in which, in most cases, the dye is not fast to diffusion.

Layers with broad spectral absorption, in which the dye is fast to diffusion, can be obtained, provided the dye contains no strongly water solubilizing group such as a sulpho group, when one equivalent of a water-soluble acid, e.g., hydrochloric acid or acetic acid, or one equivalent of a water-soluble salt, which forms water-insoluble salts with the dye, e.g. silver nitrate or lead nitrate, is added to the hydrophilic colloid composition before, during or after the addition of the aqueous solution of the dye salts.

The dyes according to the present invention that are difficulty soluble in water can also be incorporated in a form fast to diffusion and with broad spectral absorption, when using a dispersion of said dye in a hydrophilic colloid, obtained in one of the following ways :

a. a solution of the dye, in most cases in its free acid form, (M = H in the general formula) in a suitable organic water-miscible and/or water-immiscible solvent, is dispersed in a hydrophilic colloid solution, preferably an aqueous gelatin solution, occasionally in the presence of a wetting agent. For more details about such dispersing techniques, there can be referred to Canadian Pat. Specification No. 558,533 of Kodak Co. issued June 10, 1958, to U.K. Pat. Specifications Nos. 1,098,594, 1,099,414, 1,099,415, 1,099,416 and 1,099,417 all filed Jan. 25, 1965 by Gevaert-Agfa N.V., to U.S. Pat. Specification No. 2,304,940 of Leopold D.Mannes and Leopold Godowsky, Jr., issued Dec. 15, 1942 and to Fr. Pat. Specification No. 1,555,663 filed Oct. 20, 1967 by Gevaert-Agfa N.V.

b. a suspension of the dye in water is finely ground in a mill, e.g. a colloid ball mill, occasionally in the presence of a wetting agent; the hydrophilic colloid can be added before or after the milling process.

The colloids or mixtures of colloids used in the hydrophilic colloid compositions, into which the dyes are dispersed, may be of any type as commonly used in photographic materials, e.g. gelatin, casein, polyvinyl alcohol, poly-N-vinyl pyrrolidone, carboxymethylcellulose, sodium alginate, etc., gelatin being however favored. Before coating, other ingredients, such as coating aids and hardening agents, may be added to the dye dispersions.

The dyes of use according to the present invention meet the severe demands that are made on antihalation dyes, filter dyes and screening dyes for photographic silver halide materials, in other words, they do not desensitize or fog a light-sensitive silver halide emulsion, are well miscible with a photographic colloid, e.g. gelatin, can easily be incorporated into the photographic material, possess an intensive tinctorial power and are discharged quickly, completely and irreversibly without formation of colored degradation products in alkaline or acid reducing medium.

Further, the dyes according to the present invention are particularly suitable for use in the "lith"-type of photographic elements since they are very easily discharged in the "lith"-type of developers, contrary to the oxonol dyes derived from pyrazolones.

The following examples illustrate the use of dyes according to the present invention.

EXAMPLE 1

Coating solutions of the following composition are prepared:

| | |
|---|---|
| inert gelatin | 48 g |
| dyestuff as listed in the table below in an amount so as to obtain per sq.m. (after coating) the amount of dyestuff given in said table | |
| saponine | 0.8 g |
| formaldehyde (4% aqueous solution) | 1.1 ml |
| distilled water to make | 1000 ml |

The pH of these solutions is adjusted to 6.05.

The solutions are coated on subbed supports pro rata of 100 g/sq.m so that 4.8 g of gelatin are present per sq.m.

Figure 2:
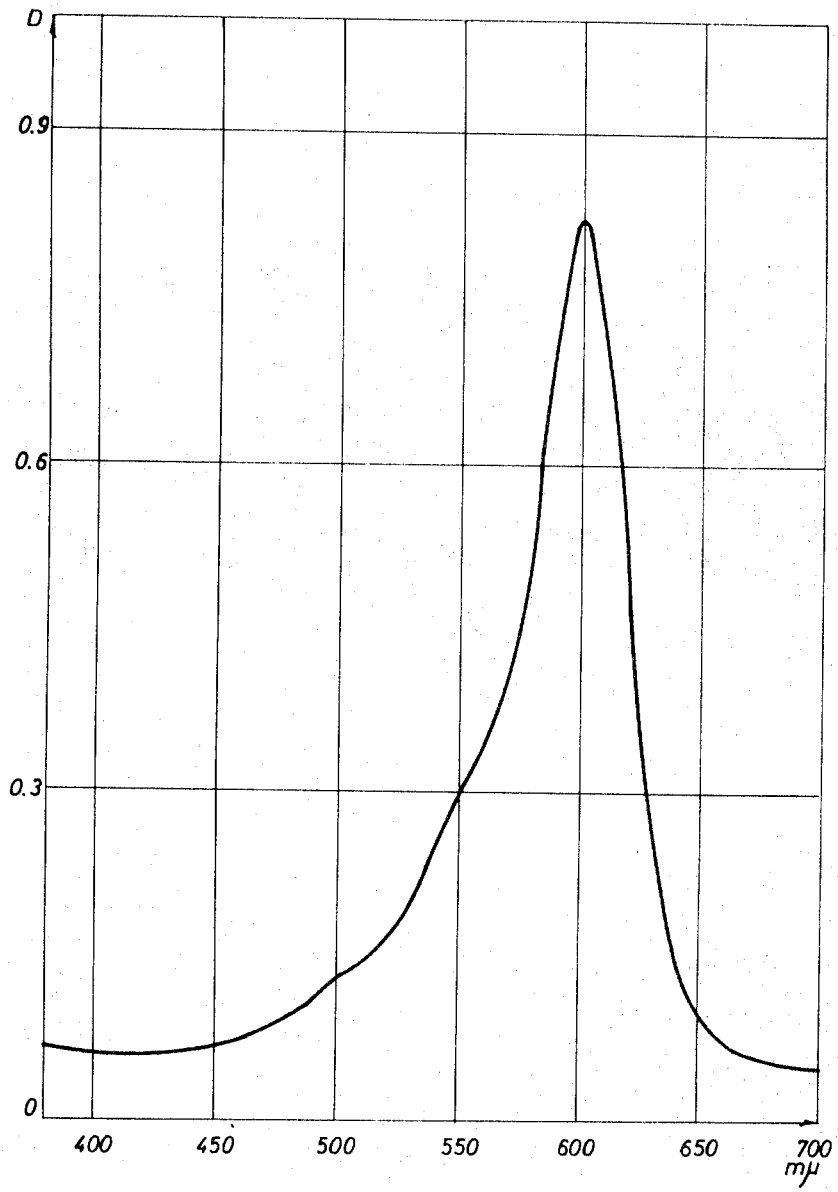

Colored gelatin layers are obtained of which the absorption maxima and spectral densities obtained are listed in the table below. The spectral absorption characteristics of the layers containing dyes 5 and 9 are represented in FIGS. 1 and 2 respectively of the accompanying drawings.

The colored gelatin layers are rapidly discolored in common photographic processing baths. It should also be remarked that in contrast with many other oxonol dyes used in antihalation layers, the common graphic "lith"-type of developers are not stained in the case of the dyes of this invention.

In the following table there is also listed the amount of dyestuff (expressed as percentage of density relative to the spectral density obtained) that remained after common color processing with an acid bleach bath (I) and with an alkaline bleach bath (II) and after common black-and-white processing (III).

TABLE

| Dyestuff: | Mg./sq.m. | Abs. max. nm. | Density | Percent residual density I | II | III |
|---|---|---|---|---|---|---|
| 1 | 100 | 493 | 0.87 | 0 | 0 | 0 |
| 3 | 100 | 494 | 1.35 | 3.7 | 3.7 | 0 |
| 4 | 50 | 494 | 0.87 | <1 | <1 | <1 |
| 5 | 100 | 495 | 1.38 | 0 | 0 | 0 |
| 14 | 75 | 495 | 1.23 | 0 | 0 | 0 |
| 15 | 50 | 495 | 0.89 | 0 | 0 | 0 |
| 16 | 100 | 495 | 1.16 | 0 | 0 | 0 |
| 20 | 200 | 495 | 1.34 | 0 | <1 | 0 |
| 8 | 50 | 600 | 0.75 | 1.3 | 1.3 | 1.1 |
| 9 | 50 | 600 | 0.83 | 0 | 0 | 1.25 |
| 11 | 50 | 595 | 0.88 | 0 | 0 | 0 |
| 12 | 50 | 600 | 0.83 | 0 | 0 | 0 |
| 21 | 50 | 595 | 0.63 | 0 | 0 | 0 |
| 22 | 50 | 595 | 0.50 | 0 | 0 | 0 |
| 23 | 50 | 598 | 0.75 | 0 | 0 | 0 |
| 25 | 150 | 595 | 1.10 | 0 | 0 | 0 |

EXAMPLE 2

To 1 kg of a silver bromo-iodide emulsion (5.5 mole percent of iodide) containing 0.33 mole of silver halide per kg and sensitized in a usual way by means of 0.29 mole per mole of silver halide of a spectral sensitizer of the following formula:

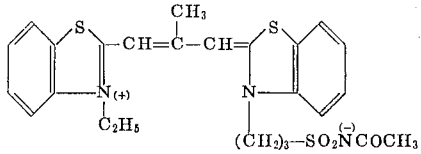

280 mg of the dyestuff 3 and 200 mg of the dyestuff 9 are added.

The silver halide material obtained shows a markedly improved resolving power and only a very low loss in spectral sensitivity.

EXAMPLE 3

A gelatino silverbromoiodide emulsion (4.5 mole percent of iodide) comprising per kg 0.62 mole of silver halide and sensitized in the usual way by means of equal parts of the following spectral sensitizers:

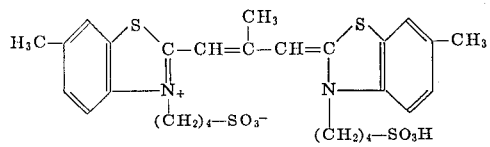

and

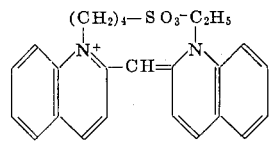

is coated on a subbed polyester film support in such a way that 1.5 mg of each of the above sensitizers and 0.015 mole of silver halide are present per sq.m.

On this first silver halide emulsion layer a second gelatino silver bromoiodide emulsion (4.5 mole percent of iodide) comprising per kg 0.62 mole of silver halide and sensitized in the usual way by means of the following spectral sensitizer:

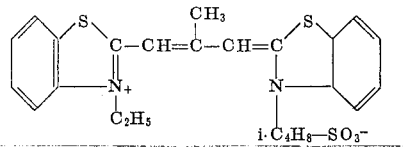

is coated in such a way that 8 mg of sensitizer and 0.045 mole of silver halide are present per sq.m.

The panchromatic film material thus formed is divided into three strips A, B and C.

On top of each of these film strips gelatin antistress layers are provided at a ratio of 1 g of gelatin per sq.m. The antistress layers of materials B and C comprise dyes according to the invention in an amount as listed in the table below.

As the dyes are not fast to diffusion part of them diffuse into the emulsion layers where they act as screening dyes without deleterious effect on the sensitivity.

The following sensitometric results were obtained.

| Material | dye per sq.m. | fog | γ | Sensitivity (log It) |
|---|---|---|---|---|
| A | — | 0.11 | 0.75 | 0.62 |
| B | 50 mg of dye 20 +50 mg of dye 21 | 0.12 | 0.83 | 0.70 |
| C | 50 mg of dye 20 +25 mg of dye 21 | 0.11 | 0.80 | 0.66 |

The values of the sensitivity are log It-values corresponding with density 0.1 above fog. A decrease of the value by 0.30 means a doubling of the speed.

Development occurred at 20° C for 8 min. in the following composition:

| | |
|---|---|
| water | 800 ml |
| sodium sulphite (anhydrous) | 100 g |
| p-monomethylamino phenol sulphate | 2 g |
| hydroquinone | 5 g |
| borax | 2 g |
| potassium bromide | 0.3 g |
| potassium iodide | 0.004 g |
| ethylene diamine tetraacetic acid trisodium salt | 1 g |
| boric acid to adjust the pH to | 8.5 |
| water to make | 1 liter |

Materials B and C showed an increased resolving power.

We claim:

1. A photographic element comprising a light-sensitive silver halide emulsion and a dye having the formula:

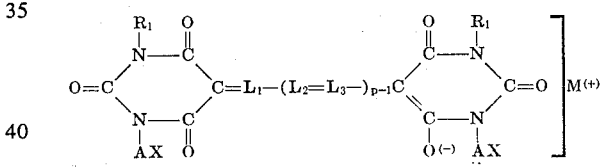

wherein:
A stands for an alkylene group including alkylene interrupted by one or more hetero atoms,
X stands for alkoxycarbonyl comprising in the alkoxy group at most 5 carbon atoms, sulpho in acid or salt form, hydroxyl, cyano, halogen or $SO_2R$ wherein R stands for an alkyl group or an aryl group,
$R_1$ stands for hydrogen, an alkyl group, a cycloalkyl group, an allyl group, an aralkyl group, or an aryl group,
each of $L_1$, $L_2$ and $L_3$ stands for a methine group,
M stands for a cation, and
p stands for 1, 2, or 3.

2. The photographic element according to claim 1 including a water-permeable colloid composition and said dye is in said colloid composition.

3. The photographic element of claim 2 wherein said colloid composition containing said dye forms a water-permeable layer separate from said light-sensitive silver halide.

4. The photographic element of claim 3 which is a multilayer, silver halide color element containing at least one optically sensitized silver halide emulsion layer and said colloidal layer shields at least said optically sensitized layer.

5. The photographic element according to claim 3 wherein said water-permeable colloid layer is an anti-halation layer.

6. The photographic element according to claim 2 wherein said element is a "lith"-type of photographic element.

* * * * *